2,901,394

FUNGICIDES

Ronald Rosher, Wilmington, Del., assignor to Hercules Powder Company, Wilmington, Del., a corporation of Delaware No Drawing. Application November 29, 1957
Serial No. 699,457

5 Claims. (Cl. 167—30)

This invention relates to treatment of water for controlling microbiological organisms, particularly fungi, bacteria, and algae which thrive on nutrients contained therein.

Water provides an efficient cooling medium for air conditioning equipment, internal combustion engines and the like, particularly since heat may be readily and economically removed in evaporative cooling towers. One disadvantage of the use of evaporate cooling towers is the tendency for fungi to grow in the towers and impair their efficiency with respect to heat exchange. Even very small amounts of nutrients found in potable water which has not been distilled apparently support their growth and growth supporting nutrients are also picked up from the air. Fungicides to overcome this disadvantage, besides being highly effective, must (1) have a low vapor pressure so as not to be lost with the evaporating water, (2) be relatively nontoxic and (3) not emit objectionable vapors from the evaporators. This latter requirement is particularly important where the evaporative towers are in residential areas where odorous or irritating vapors must not be evolved.

In accordance with the present invention it has now been found that m-nitrophenacyl chloride provides an effective fungus-inhibited water free of all of these objections when the water contains dissolved therein at least about 5 p.p.m. and preferably at least about 10 p.p.m. m-nitrophenacyl chloride.

m-Nitrophenacyl chloride is known in the art and is readily obtained by chlorination of m-nitroacetophenone.

The fungus-inhibited water of this invention is prepared by dispersing the m-nitrophenacyl chloride in water by mechanical dispersion of the solid or the melt. When the water contains more nutrients than are normally present in potable water, more m-nitrophenacyl chloride than will dissolve therein is preferably present as a dispersion so as to provide a reserve to draw on to maintain a saturated solution of the m-nitrophenacyl chloride and thus maintain a high fungicidal concentration. A concentration high enough to prevent the growth of fungi is sufficiently high to prevent the growth of bacteria. For instance, agar plate tests show the following minimum concentrations of m-nitrophenacyl chloride which will prevent the growth of the indicated bacteria and fungi.

| | Concentration (Percent) |
|---|---|
| Bacteria: | |
| Pseudomonas aeruginosa | 0.03 |
| Streptococcus faecalis | 0.001 |
| Micrococcus pyrogenes (var. aureus) | 0.001 |
| Aerobacter aerogenes | 0.005 |
| Bacillus mycoides | 0.001 |
| Sporovibrio desulficans | 0.001 |
| Fungi: | |
| Penicillium glaucum | 0.050 |
| Aspergillus terreus | 0.030 |
| Aspergillus niger | 0.030 |

The m-nitrophenacyl chloride is preferably added to the water by adding a readily dispersible composition such as a water-base emulsion or a solution in a water dispersible volatile organic solvent. A suitable water dispersible emulsion contains 5–25% m-nitrophenacyl chloride, 5–10% surface active dispersing agent, and a complement of a volatile organic solvent capable of dissolving m-nitrophenacyl chloride. Surface active dispersing agents that may be used include alkali metal soaps of resin, alginic and fatty acids, alkali metal salts of sulfates of long chain fatty alcohols of 12–18 carbon atoms, esters of long chain fatty acids and polyhydric alcohols in which the alcohol groups are free, omega-substituted polyethylene glycols of relatively long-chain length, particularly those in which the omega substituent is aryl, alkyl or acyl, sorbitol monolaurate polyoxyethylene derivative (Tween 20) and similar well known dispersing agents well known in the insecticide and disinfectant field for the dispersing of pesticides in water. Organic solvents which find utility in these concentrates are: benzene, toluene, xylene, acetone, methyl ethyl ketone, ethyl alcohol, lauryl alcohol, ethyl acetate, and ethers, particularly those of glycol and glycerol.

The m-nitrophenacyl chloride concentrates in organic solvents which are poured directly into water with good agitation to obtain a dispersion use water-soluble or water-dispersible solvents. Useful organic solvents are the lower aliphatic alcohols, acetone, methyl ethyl ketone, ethyl acetate and glycol ethers of lower aliphatic alcohols. It is preferable to use the solvents which dissolve the most m-nitrophenacyl chloride such as acetone or ethyl acetate. Acetone is the preferred solvent. The concentrations of the m-nitrophenacyl chloride will vary from about 3% to about 25% depending on the solvent used. In the case of acetone, a saturated solution will contain about 25% m-nitrophenacyl chloride.

Fungus-inhibited water containing m-nitrophenacyl chloride is noncorrosive to metals when noncorrosive water is used. If corrosion inhibitors are added to the make-up water, the fungus-inhibited water is not impaired thereby. The make-up water used is preferably essentially neutral but may have a pH in the range of 7–8, The fungus-inhibited water of this invention is particularly useful for use in evaporative cooling towers which are used in residential areas, since m-nitrophenacyl chloride in the water vapor or spray therefrom is not toxic, irritating, or odorous. It is also useful in other water which must be rendered toxic to bacteria and fungi for industrial uses where the industrial process involved introduces fungi-supporting nutrients. For instance, white water of the paper industry is successfully treated with m-nitrophenacyl chloride to prevent the growth of slime and other microbiological flora on the nutrient material contained therein. This is of great importance because of the reuse of such water and the need to avoid slime and fungi which would spot the finished paper prepared with such water. The water used in this process must likewise be non-corrosive and non-irritating and the m-nitrophenacyl chloride fulfills these requirements. Tests showed that 10 p.p.m. m-nitrophenacyl chloride in pulp mill white water prevented the growth of bacillus mycoides and 50 p.p.m. inhibited the growth of acelobacter aerogenes. Likewise, the fungus-inhibited water of this invention is useful as the water used in water-base latex emulsion paints.

Among the fungi which fail to grow in the fungus-inhibited cooling water of this invention which contained fungi growth supporting nutrients and which before treatment did support their growth are: Aspergillus niger, Aspergillus terreus, and Penicillium glaucum. Myxomycetes also failed to grow in white water of the paper industry when m-nitrophenacyl chloride was present. In view of the fungus-inhibiting action of m-nitrophenacyl chloride, the treated water of this invention has the further advantage of inhibiting corrosion due to fungi and bacteria such as those which convert sulfates to sulfides. Such cooling water of this invention may be used in engine cooling systems and in oil well drilling muds and wherever fungus-inhibited water is desirable as well as in evaporative cooling systems and the treated water may be used in many industrial processes besides paper mills where the water is used over and over again and contains fungi supporting nutrients.

What I claim and desire to protect by Letters Patent is:

1. The method of rendering water fungicidal which comprises dispersing therein at least about 5 p.p.m. m-nitrophenacyl chloride.

2. A composition dispersible in water for inhibiting fungi growth which comprises a water-dispersible volatile organic solvent containing dissolved therein about 3–25% m-nitrophenacyl chloride.

3. A composition of claim 2 in which the organic solvent is acetone.

4. A composition of claim 2 in which 5–10% of a surface active dispersing agent is dissolved.

5. Water protected against the growth of fungi therein comprising a water dispersion of m-nitrophenacyl chloride of concentration from above 5 p.p.m. to saturation.

References Cited in the file of this patent

UNITED STATES PATENTS

| | | |
|---|---|---|
| 2,140,401 | Fink | Dec. 13, 1938 |
| 2,284,889 | Fisher | June 2, 1942 |
| 2,419,021 | Harnden | Apr. 15, 1947 |

OTHER REFERENCES

Chem. Abs. 32, 8620(9), 1938; 49, 10878(g) 1955.